United States Patent
Coakley

[15] 3,691,767
[45] Sept. 19, 1972

[54] REVERSIBLE FLUID POWER TRANSFER APPARATUS

[72] Inventor: James L. Coakley, Camarillo, Calif.
[73] Assignee: Abex Corporation, New York, N.Y.
[22] Filed: Nov. 19, 1970
[21] Appl. No.: 91,114

[52] U.S. Cl..................................60/53 R, 137/495
[51] Int. Cl..............................................F15b 15/18
[58] Field of Search................60/53 R, 51; 157/495

[56] References Cited

UNITED STATES PATENTS

| | | | |
|---|---|---|---|
| 3,583,157 | 6/1971 | Adams | 60/53 R |
| 2,961,829 | 11/1960 | Weisenbach | 60/53 R |
| 3,049,884 | 8/1962 | Schroeder | 60/53 R |
| 2,768,500 | 10/1956 | Tyler | 60/53 R |
| 2,775,204 | 12/1956 | Batten et al. | 60/53 R |
| 3,402,549 | 9/1968 | Connett et al. | 60/53 |
| 3,581,497 | 6/1971 | Krumholz | 60/53 R |

*Primary Examiner*—Edgar W. Geoghegan
*Assistant Examiner*—L. J. Payne
*Attorney*—Wood, Herron & Evans

[57] ABSTRACT

In a reversible fluid power transfer package, sensing means detect which of two mechanically interconnected fluid pressure translating devices is required to operate as a pump and which is required to operate as the motor. In response to a signal from the sensing means, dual-functioning check valve-flow limiter components associated with each device are ported according to the required mode of function of the respective device, so that whichever device is to operate as the motor is automatically provided with a flow limiter valve, and whichever device is to operate as the pump is automatically coupled to a check valve on its outlet side. The check valve may incorporate variable bypass features.

11 Claims, 4 Drawing Figures

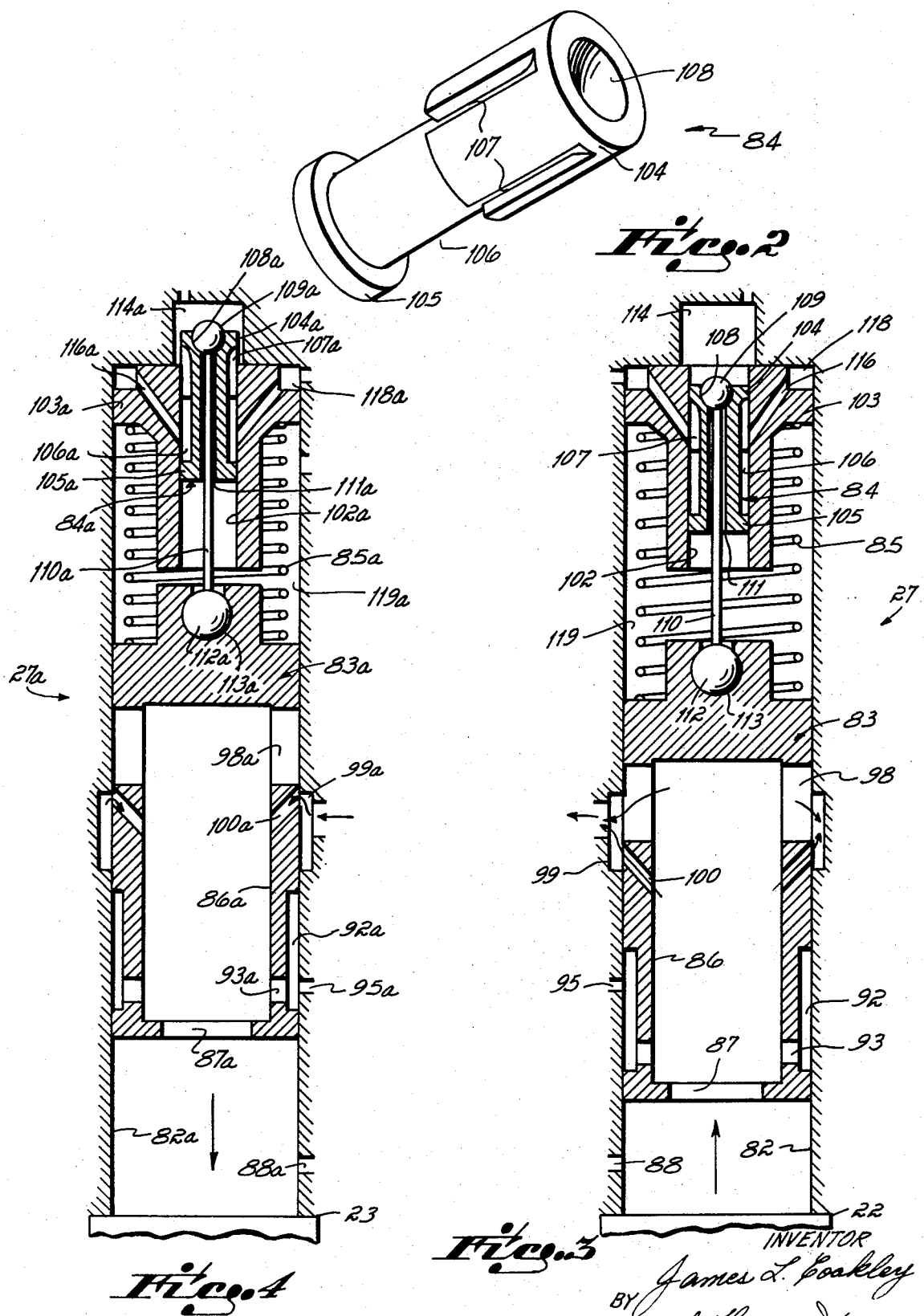

REVERSIBLE FLUID POWER TRANSFER APPARATUS

This invention broadly concerns the transfer of power from a fluid motor operating in one fluid system, to a pump operating in a second fluid system. Mechanism of this type is referred to hereinafter as fluid power transfer apparatus, or as a transfer package.

Such apparatus is utilized to enable one system to drive or provide pressure fluid in the second system, as for example where a primary source of power in the second system fails or is not operating. Each system may and usually does have its own main pump for developing pressure, and the power transfer package is used to drive a secondary or auxiliary pump if the main pump is disabled or is not operating.

Multi-engine aircraft commonly have a plurality of fluid systems. These are coupled through a transfer package to provide redundancy so that if one system fails, another can be used to operate the pressure operated devices of the aircraft. Thus, if, for example, the main pump shaft of one fluid system were sheared, the transfer package will deliver torque from a motor in a system which remains operating, to an auxiliary pump in the system in which the main pump is inoperative. Such systems are becoming common, for example, to operate aircraft landing gear and aerodynamic control surfaces.

Transfer packages are also utilized in aircraft to facilitate ground testing of the various fluid pressure systems of the aircraft, without starting the engines. An electric motor is energized to drive the main pump in one system and power from that system can be transferred through a transfer package to the other systems, so that those systems can be tested without starting the engines which drive their main pumps, and without including separate electric motors in each system for checkout testing.

It is often desirable to provide means for limiting the flow of fluid through the motor of a transfer package. The flow limiting means prevent overspeeding of the motor, such as might occur for example in the event of a line break in the driven system which would depressurize the pump. That pump would then provide no resistance to motor operation, and the motor would overspeed and possibly be damaged. The flow limiting means is also useful to limit the amount of power drawn from the motor, to prevent improper operation of the system in which it is installed.

It is also desirable that the pump in a transfer package be connected to the load system through a check valve on its output side, and that a bleed or bypass to tank be incorporated between the pump and check valve, so that some fluid can be spilled to tank if the load demand for flow is low. This prevents erratic operation at low demand flow, at which the pump otherwise might tend to stall the motor. As a further refinement it is also desirable that the bypass means be variable rather than fixed, so that the output flow delivered by the transfer pump is split or divided between the load system and the reservoir in accordance with the demand flow to the load. In this regard, my copending U.S. Pat. application Ser. No. 83,330 filed Oct. 23, 1970, discloses a variable bypass for a transfer package whereby the bypass flow can be proportionately and progressively reduced as the demand flow increases, and vice versa.

Thus, the transfer motor should have flow limiting means associated with it, and the transfer pump should have a check valve and a bypass, preferably a variable bypass combined with the check valve associated with it. In some instances it is also desirable to have reversibility of operation, that is, reversibility of the direction of power transfer so that the first system can deliver power to the second if necessary, and so that the second can deliver power to the first if necessary. Such reversibility demands that the fluid pressure translating device in each system must be capable of operating, as conditions warrant, as a motor or as a pump. Where the package is reversible, each fluid pressure translating device should be connected to a flow limiting valve when the device is operated as a motor, but it should be connected to a check valve or variable bypass check valve when it is operated as a pump.

So far as I am aware there is presently available no control for a transfer package which permits reversibility of operation such that the transfer package may be operated in either direction, and will, in either direction, have flow limiting means for the motor and a check valve or a variable bypass check valve for the pump. It is a primary advantage of this invention that it provides such a control.

It is another advantage of the invention that such control capability is provided with a minimum of components and weight, bearing in mind that weight of a transfer package is an especially important factor where the package is to be used in aircraft.

It is a further advantage of the invention that means are provided which automatically sense or detect which of the systems is the output system and which is the input system, and flow limiting means is automatically provided for the output system and check valve means for the input system.

It is a further advantage of the invention that the sensing means automatically reverse the controls, including the flow limiting and check valve functions, when the direction of power transfer is reversed.

According to the preferred embodiment of the invention, sensing means responds to comparative pressures in the two fluid systems served by the pair of translating devices. Corresponding pressure signals are applied to two mode determining components with each of which there is associated a combination or dual acting check valve and flow limiter. Depending upon its porting as established by the mode component, each of the dual functioning components can operate either as a flow limiter for the respective device when the latter is operating as a motor, or as a check valve when the respective device is operating as a pump. The mode component switches the porting of the dual functioning check valve-flow limiter according to the operation of the associated fluid pressure translating device as a motor or as a pump.

Those skilled in the art will recognize that the functions of flow limiting and check valving are to an extent opposed or inconsistent with one another. Thus, a flow limiter is biased open when a control chamber pressure is equal to the system pressure; conversely, a check valve is biased shut when the control chamber pressure is equal to the system pressure. Ideally the flow limiter should permit large flow, up to some limiting value, but the check valve must block flow under the same relative pressure conditions. These inconsistent functions therefore present difficulty if a single component is to be used alternately as a check valve and as a flow limiter. This invention provides structure wherein both functions are combined in a single dual functioning component which, depending upon porting, does act as a flow limiter or as a check valve.

Each of these dual functioning components includes a movable valve element or spool slidable in a bore and which is responsive to pressures acting on opposite surfaces thereof. One surface is exposed to system pressure, and other or opposed surface portions are acted upon by pressures in primary and secondary control chambers. An orifice in the spool cooperates with a port in the bore to form the throttling valve when in operation as a flow limiter, and alternately this valve closes to block reverse flow when in operation as a check valve. In addition, the spool has associated with it a bypass feature, which, when the spool is in use as a check valve, bypasses the entire pump output to tank if the fluid system served by the pump requires no demand fluid. As the demand flow increases the bypass flow is reduced.

A spring urges the spool toward open position. When in use as a flow limiter, flow through a restrictor creates a pressure difference which is reflected in both the primary and secondary control chambers. The pressures in those chambers are increasingly reduced as flow increases. When the system and control pressures are about equal, the spring holds the valve open. Thus a net valve closing pressure force is established as the result of the higher system pressure in comparison to the lower pressure in the two control chambers. This net pressure force eventually exceeds the spring force and will close the valve as a limiting flow is approached.

When the flow limiter-check valve component is to operate as a check valve, the primary control chamber is ported to communicate with the pump outlet and the secondary chamber is vented to tank. The spring tends to open the valve as before, but the venting of the secondary chamber introduces a closing pressure force bias, which overcomes the spring opening bias, when system pressure equals the pump outlet pressure.

The advantages and details of the invention can best be further described by reference to the accompanying drawings, in which:

FIG. 2 is a perspective view of the bypass piston of the flow limiter-check valve component;

FIG. 3 is a view of the right hand check valve-flow limiter component of FIG. 1, illustrating the flow through the throttling orifice when the component is functioning as a flow limiter; and FIG. 4 is a view of the left hand check valve-flow limiter component of FIG. 1, illustrating the orifice as it starts to open in operation as a check valve.

Figure 1:
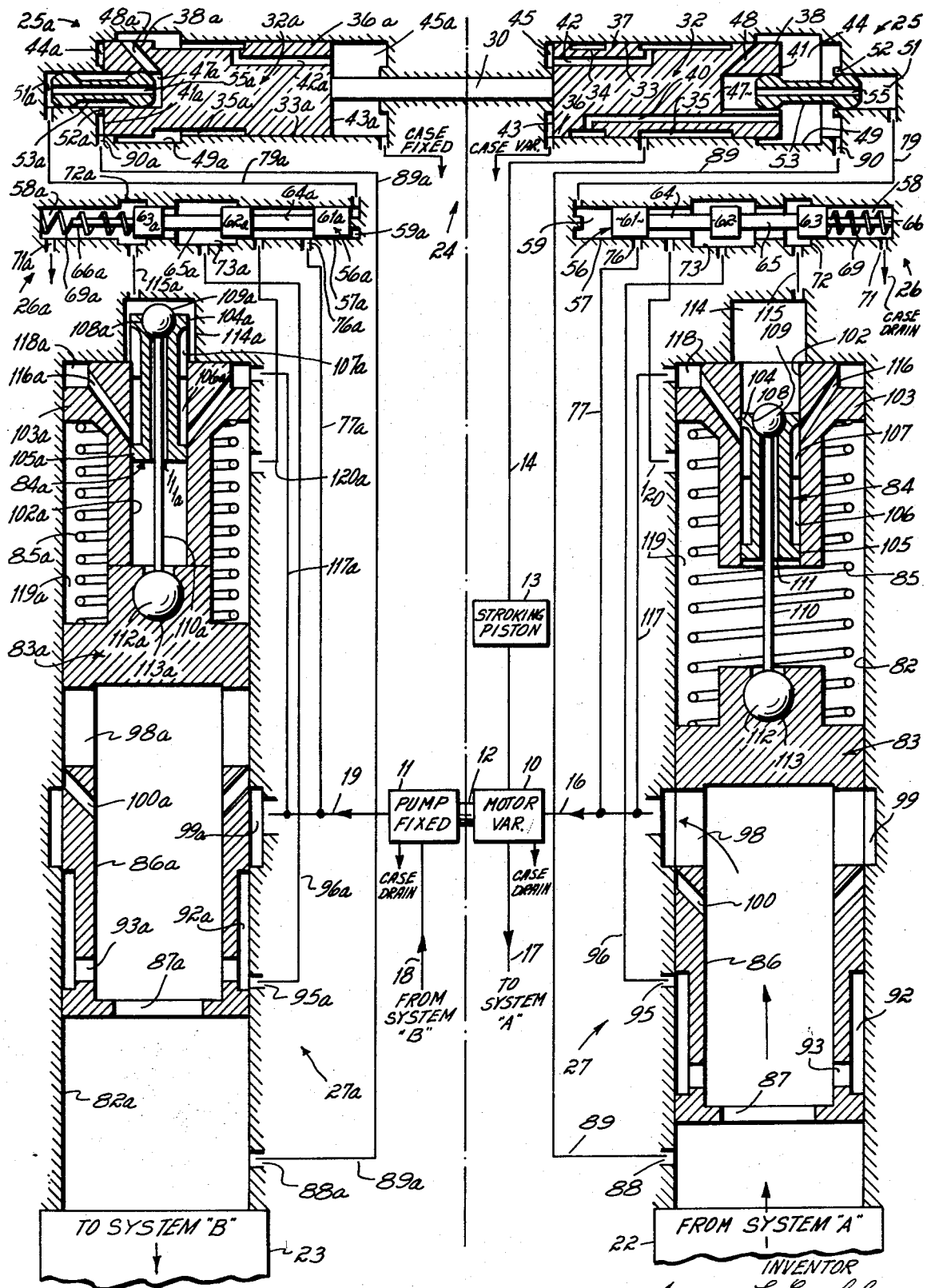
FIG. 1 is a schematic view of a portion of two fluid systems coupled by a reversible fluid power transfer package and control in accordance with a preferred embodiment of the invention, and includes longitudinal sectional views of the components of the control.

In the preferred embodiment of the invention which is shown in the drawing for purposes of explanation, two fluid pressure translating devices 10, 11 are mechanically interconnected by a shaft 12. Each of the devices 10 and 11 can be operated alternately as a pump or as a motor. When one of the devices is operated as a motor it will transmit mechanical power through shaft 12 to drive the other device as a pump. In the drawing, the package is shown with device 10 operating as a motor and driving device 11 as a pump. Each device 10, 11 may be hydraulic or pneumatic; in the following description it is assumed that both are hydraulic.

Preferably one of the devices 10, 11 is of variable displacement, so that its volumetric displacement per unit time can be changed. In FIG. 1 device 10 is shown as the variable device, and has displacement changing apparatus operated by a stroking piston or fluid motor 13. Application of pressure fluid to stroking piston 13 via line 14 reduces the displacement. Device 11 is shown as a fixed capacity device.

Each of the pressure translating devices 10 and 11 may be of generally conventional type; for example, they may be vane type devices, or axial piston devices. For that reason their internal constructions are not shown.

Variable device 10 is connected in a fluid system or circuit A, shown only in part, and on its pressure side has a fluid inlet line 16 which receives pressure fluid from the A system in which device 10 is connected. Variable device 10 discharges to an outlet or discharge line 17 in system A. System A may for example operate landing gear of an aircraft, and includes a primary fluid pump, not shown, which is operated by prime mover which may be a main jet engine of the aircraft, or a generator driven electric motor. That primary pump supplies the pressure fluid to line 16 which operate the pressure translating device 10 as a motor.

Fixed device 11 receives fluid from an inlet line 18, and on its pressure side discharges pressure fluid to an outlet line 19. Under the operating conditions shown in the illustration, with device 11 operating in the pump mode, line 18 is a suction line and line 19 is a pressure line. As will be described, the pressure fluid demanded by the work load is supplied from line 19 to the system B which includes the load. Like system A to which variable device 10 is connected, system B includes a primary pump, not shown, which may also be operated by an electric motor or by an aircraft engine.

Unless or until some reason arises for transferring power from one circuit to another, the devices 10 and 11 are ordinarily blocked from their respective systems in order to minimize the waste of power through friction. For this purpose blocking valves 22 and 23 may be provided. When the valves 22 and 23 are closed, the entire transfer package is bypassed by the fluid flowing in the A and B systems; when the valves 22 and 23 are open, devices 10 and 11 are subjected, on their pressure sides, to the pressure of fluid in the respective systems. In the event of pressure failure in one of the systems A or B, or other event such as ground checkout which makes it desirable to transfer power from one system to the other, the blocking valves 22 and 23 are opened, either manually or electrically, thereby connecting the devices 10 and 11 in the respective systems, so that power transfer can occur.

In the conditions shown in FIG. 1 it is assumed that power is to be transferred from system A to system B.

Loss of power in the B system may have arisen, for example, by shearing of the shaft of the main pump in that system so that no pressure is developed in line 19. The fluid power transfer package is used to deliver power in the form of mechanical torque through shaft 12 to drive device 11 as a pump so that device 11 will supply fluid pressure to line 19 to operate the load served by the B system.

The transfer package includes sensing means generally designated by 24 which responds to the reduction or loss of pressure in a system to actuate the package controls by which reversibility is achieved. The device 10 is served by three components, a pressure sensing shuttle half indicated generally at 25 and which is part of the sensing means 24, and controls including a mode shuttle designated generally at 26 and a combination or dual function flow limiter-check valve component designated generally at 27. The other fluid pressure translating device 11 is served by a pressure sensing shuttle half 25a, which is also part of the sensing means 24, and controls including a mode shuttle 26a and a combination or dual function flow limiter-check valve 27a. As can be seen from FIG. 1, the shuttle half 25 associated with variable device 10 is similar to the shuttle half 25a associated with fixed device 11, except that shuttle half 25 includes additional porting for operating the stroking piston 13. The shuttle halves 25 and 25a are isolated fluidically but are interconnected mechanically by a tie rod 30, so that both halves move or shuttle together.

The mode shuttle 26 for the variable device 10 may if desired be identical to the mode shuttle 26a for the fixed device, although this is not essential. Similarly, the combination flow limiter-check valve 27 may be and is shown as being similar to the component 27a, although they also may differ.

Each component 25, 25a, 26, 26a, 27 and 27a operates in either of two modes, a "motor" mode and a "pump" mode. The components of the respective pairs always operate in opposite modes; that is, when shuttle half 25 is in the motor mode (as shown) the other component 25a of that pair is in its pump mode, and so on.

By reason of the similarity of the respective components as depicted in the drawings, the identifying numbers applied to elements associated with the variable device 10 are applied, with the suffix *a*, to the corresponding elements associated with the fixed device 11; thus device 25a corresponds to device 25, etc.

It is the function of the sensing means 24 to detect which system A or B requires transfer of power to it, and to cause the components associated with the device 10 or 11 of the other system to provide the flow limiting function desired for operation of that device as a motor. It is also the function of the sensing means 24 to cause the components associated with the device which is to be driven as a pump, to provide the check valve and bypass function which are desirable for such pump operation. In addition, the shuttle half 25 operates the stroking piston 13 of the variable device 10.

The mode shuttles 26 and 26a are responsive to the respective sensing shuttle halves 25 and 25a, and in turn they port the respective components 27, 27a to operate either as a flow limiter or as a variable bypass check valve. Component 27 is shown in FIGS. 1 and 3 in operation as a flow limiter, which limits the rate of flow of fluid in line 16 to device 10 when the latter is operating as a motor. Component 27a is shown in FIGS. 1 and 4 in operation as a check valve which divides the output flow from the device 11 between the B system and a fluid reservoir as necessary.

The Sensing Means

With respect to the sensing means 24, its half 25 comprises a movable valve element or spool 32 which is axially slidable in a bore 33. Spool 32 has spaced circumferential grooves 34 and 35 which are defined between lands 36, 37 and 38. An internal passage 40 in spool 32 provides fluid communication between groove 34 and end face 41 of the spool. Face 41 is exposed to fluid pressure in a control chamber 44 in bore 33, pressure in which tends to move the spool leftward. Another internal passage 42 provides fluid communication between groove 35 and the other end face 43, which is exposed to pressure in a chamber 45. The latter chamber is vented, for example to tank, not shown, through the case of the variable displacement device 10. (Where the fluids of the two systems are not to be isolated, venting can be to a common tank or reservoir.) The tie rod 30 extends from the left face 43 of spool 32, and interconnects or couples spool 32 to the spool 32a of component 25a.

Spool 32 has a central recess or bore 47 adjacent face 41, and a diagonal bore 48 connects bore 47 at all times with a peripheral groove 49 formed in bore 33. A bore 51 extends from the end of bore 33, and a boss or raised stop 52 around the entrance to bore 51 limits the rightward movement of spool 32.

A dumbbell shaped element 53 having enlarged generally spherical portions at its ends extends between bores 47 and 51. One spherical end portion forms a sliding fluid seal with bore 47 in spool 32, and the other end forms a sliding fluid seal with bore 51. A central bore 55 through element 53 equalizes the pressure in bore 47 with the pressure in bore 51 at all times. Those skilled in the art will understand that the purpose of the spherical end portions on element 53 is to avoid concentricity problems that might arise if a straight cylindrical piston were provided and the use of such spherical end portions is a desirable but not a necessary feature of the invention.

The Mode Shuttle

Turning next to the mode shuttle 26, it includes a spool element 56 which is slidable in a bore 57. Opposite ends of the spool are exposed to chambers 58 and 59. Spool 56 has three spaced lands 61, 62 and 63, separated by grooves 64 and 65. A stop 66 extends from land 63 in chamber 58 and limits rightward movement of element 56 to the position shown in FIG. 1. A biasing spring 69 around stop 66 exerts a leftward biasing force on element 56. Chamber 58, in which spring 69 is contained, is connected by passage 71 to the case of the variable displacement device 10 or to a tank.

The bore 57 in which the mode shuttle spool 56 is situated has a groove 72 which, when the spool is in the motor mode as shown, is in fluid communication with the groove 65 of spool 56 and through that groove with a second groove 73 in bore 57. In the pump mode (in which the other mode shuttle spool 56a is shown) groove 72 is in communication with the chamber 58, and is blocked from groove 65. Thus, as mode shuttle spool 56 moves, land 63 acts as a valve for groove 72 alternately connecting it to the groove 65, and to the bore portion 58. Groove 73 of bore 57 connects spool grooves 64 and 65, bypassing land 62, when component 26 is in the motor mode. In the pump mode, land 62 blocks communication of groove 73 to spool groove 64, but groove 73 remains in communication with spool groove 65 (see mode shuttle 26a). A port 76 in bore 57 is connected by a line 77, to line 16. In the motor mode, land 61 closes port 76; in the pump mode, port 76 is in fluid communication with the groove 64. Chamber 59 of bore 57 is at all times connected by a line 79 to bore 51 of the pressure sensing shuttle half 25.

The Flow Limiter-Check Valve

The flow limiter-check valve 27 is contained within a bore 82 and includes a movable spool 83 and a bypass valve element 84. Spool 83 is slidable in bore 82; valve element 84 is slidable in a bore 102 in a fixed insert 103 in bore 82. A spring 85 between insert 103 and spool 83 biases the spool downwardly, toward the position shown in FIG. 1.

Spool 83 contains a stopped bore 86, at the lower end of which an orifice or flow restrictor 87 is formed as a smaller diameter throat or choke around bore 86. Fluid from system A passes directly through orifice 87 as it flows toward motor 10 (correspondingly, fluid flows from pump 11 through orifice 87a as it flows to system B, see FIG. 4). A port 88 in bore 82, below spool 83, at all times communicates the pressure of fluid below orifice 87, through a line 89 and a port 90 into chamber 44 of pressure sensing shuttle half 25.

A peripheral groove 92 around spool 83 is connected with bore 86 above orifice 87 thereof, by a series of ports 93. Groove 92 is at all times in communication with a port 95 in bore 82, and port 95 leads through line 96 to groove 73 of mode shuttle 26.

Radial orifices or ports 98 are formed through the side wall of spool 83 and form a throttling or choking valve with a peripheral groove 99 in bore 82. Groove 99 is connected to the inlet side of motor 10 (correspondingly, the groove 99a of component 27a is connected to the outlet line 19 of pump 11).

Optional angulated or diagonal bores 100 extend through the wall of spool 83 from internal bore 86 thereof, and intersect the outside wall close to the opening thereto of ports 98. As will be explained, the angulation of these diagonal bores 100 imparts greater stability to the operation of the flow limiter valve.

The insert 103 within which bypass valve element 84 slides is provided to simplify manufacturing, and does not move within bore 82. Element 84 is shown in perspective in FIG. 2. It is generally cylindrical in form, and includes a pair of lands 104, 105 separated by a groove 106. A plurality of longitudinal or axially extending slots 107 extend part way along the longitudinal dimension of land 104 from groove 106. A generally hemispherical socket or seat 108 is formed at one end of the element 84, and this seat receives a spherical ball 109 at one end of a connecting rod 110 which extends loosely through an axial opening 111 in element 84. At its lower end, connecting rod 110 has another spherical ball 112 and this ball is seated in a generally hemispherical socket 113 formed in the upper end of spool 83. Ball 112 is preferably pinned or swaged in socket 113, so that upward movement of element 84 will move spool 83 upward with it. The ball coupling avoids problems of sticking that can arise from non-concentricity of the axes of bores 82 and 102, much in the manner of element 53. This is a desirable but not a necessary feature.

A body bore 114 is formed above bore 102, to permit upward movement of the element 84 to the position in which element 84a is shown in FIG. 1. Bore 114 is connected by a line 115 to the groove 72 of the mode shuttle 26.

A diagonal bore 116 provides fluid communication through insert 103 between bore 102 therein and a groove 118 around the external surface of the insert. A fluid line 117 extends between groove 118 and the inlet line 16 of device 10 (correspondingly, line 117a is connected to the outlet line 19 of device 11). The chamber 119 in bore 82 which is above spool 83 is connected at all times by a line 120 with groove 64 of the mode shuttle 26. Chamber 119 is a main or primary control chamber for the operation of spool 83, and bores 102 and 114 comprise a secondary control chamber.

Operation

The transfer apparatus will transfer power from one system to the other in accordance with the relative pressures in the two systems. The pressure in system A is reflected at all times (when blocking valve 22 is open) upon surface 41 of pressure sensing shuttle half 25, via port 88, line 89, and port 90. Similarly, the pressure in system B, served by fixed unit 11, is reflected on end surface 41a of pressure sensing shuttle half 25a. The other end faces 43, 43a of the respective shuttle halves are exposed to the low pressure in the cases of the variable and fixed units respectively (if fluid isolation of the two systems is desired). In general the pressures in chambers 45, 45a may be equal and negligible, and the areas of faces 43, 43a equal; for purposes of the following discussion it is assumed that the forces on the faces 43, 43a are equal and negligible. Thus the only significant forces acting on the pressure sensing shuttles 25, 25a are the opposed forces resulting from the pressures in lines 79 and 89 on the right shuttle half 25, and from the pressures in lines 79a and 89a on the left shuttle half 25a. In the condition illustrated in FIG. 1, pressure of fluid in chamber 44 (which is equal to the pressure of fluid in line 89) is applied through bore groove 49, diagonal bore 48 into spool bore 47 and through axial bore 55 into bore 51. Thus essentially the same pressure acts across the entire end area of spool 32, and the resulting force holds spool 32, connecting rod 30, and the other spool 32a in the position shown in FIG. 1. Fluid in bores 47a and 51a is vented to tank through diagonal bore 48a, groove 49a, spool groove 35a, passage 42a, and chamber 45a which is connected to case. Thus the pressure sensing means is latched in the position shown.

The pressure sensor will remain in this position until the pressure in line 89 (which reflects the pressure in system A) is reduced to a value (normally less than the pressure in system B) determined by the relative areas of faces 41, 41a and bores 47 and 47a. If the pressure in line 89 should drop to that level, then the spools 32, 32a will move rightward and variable unit 10 would be operated as a pump and fixed unit 11 as the motor. When this motion is accomplished, because of the porting on spools 32 and 32a bore 51a is connected to pressure and bore 51 is vented to tank. Thus the spools will remain in either given position until the pressure drops to the required level for shifting to occur. It will thus be seen that there is a "deadband" or range of pressures in which pressure fluctuations do not cause switching, and this prevents "hunting". It will also be appreciated that the detection of a malfunction or a need for pressure in one of the systems such as to require power to be transferred to that system can be accomplished by other means than the particular pressure sensing means shown.

By reason of friction and internal loss of power, the capacity of whichever device is to act as the pump will usually be less than that of the motor driving it. It is to maintain this relation in the reversible power transfer package that the displacement of one device is variable and the other is fixed. For the most common case, in which the normal operating pressure in system A and system B is the same, the maximum displacement of the variable device should be greater than the displacement of the fixed device; and the minimum displacement of the variable device should be less than the displacement of the fixed device. For example, if the fixed device 11 has a displacement of 10 gpm, the variable device could be selected to have a maximum displacement of 11 or 12 gpm, and a minimum of 8 or 9 gpm. By operating the variable device at its maximum displacement as a motor, its displacement will exceed that of the pump. Similarly, by operating the variable device at its minimum as a pump, its displacement will then be less than that of the motor driving it. Displacement of variable device 10 is increased by release of pressure fluid from behind the stroking piston 13, through line 14, spool groove 35, passage 42 and chamber 45 to the case of the variable unit. When the variable unit is to act as a pump, pressure fluid is supplied into line 14 from groove 34, line 40, chamber 44 and line 89 to move the stroking piston to a position effecting minimum displacement.

The pressure in bore 51 of the pressure sensing shuttle half 25 is applied to the mode shuttle 26 through line 79 into chamber 59, where it acts on the end face of spool land 61. The chamber 58 at the other end of spool 56 is vented to case or tank through port 71. The unbalanced force of pressure in chamber 59 compresses spring 69 moving spool 56 of mode shuttle 26 to the position shown in FIG. 1. In this position land 61 closes port 76, and land 63 blocks communication between groove 72 and bore chamber 58 but permits communication between groove 72 and spool groove 65. Groove 73 provides a bypass around land 62 between grooves 64 and 65. Pressure of fluid in groove 73 is applied through groove 64 and line 120 into the chamber 119 which is above spool 83. The pressure of fluid in groove 73 is also applied through groove 65 to groove 72 and through line 115 into bore 114 where it acts on the upper end area of the bypass piston 84.

It is the pressure in the chamber 59 or 59a associated with the particular mode shuttle under consideration which determines the position of that shuttle. When that pressure is high (for example equal to the pressure in line 89 or 89a), the spring 69 or 69a is compressed and the mode shuttle is displaced to a position that ports the flow limiter-check valve component 27 or 27a so that it acts as a flow limiter. Alternately, when the pressure in chamber 59 or 59a is low, the spring expands and the mode shuttle is displaced to that position (the position of the mode shuttle 26a in FIG. 1) that ports the flow limiter-check valve component to act as a check valve. It should be noted that it is possible to change the porting so that pressures of the opposite sense control the mode shuttle. For example, the pressure of the stroking piston can be used to control mode shuttle 26 within the concept of the invention.

With variable unit 10 operating as a motor, inlet flow in bore 82 passes through orifice 87 in spool 83, causing a reduced pressure in the vicinity of holes 93. This reduced pressure is transmitted through groove 92 to port 95 and through line 96 to groove 73 of the mode shuttle 26, from groove 73 through line 120 to primary control chamber 119 in bore 82 where it exerts a downward or valve opening force on spool 83. Pressure from groove 73 is also transmitted through line 115 into the secondary control chamber formed by bores 114 and 102, and acts downwardly on the upper surface of the bypass piston 84. The total area above spool 83 thus sees the reduced pressure downstream of restrictor 87 (under these circumstances the bypass piston and associated porting can be ignored).

The ports 98 in spool 83 cooperate with groove 99 to define a throttling valve or orifice which regulates the flow of inlet fluid from bore 82 to motor inlet line 16. The valve 98, 99 is shown in full open position in FIG. 1, and it progressively closes by upward movement of spool 83, see FIG. 3. As inlet flow increases, the pressure drop across orifice 87 increases, and the pressure in line 96 is reduced. Since the pressure in line 96 is directed or ported by mode shuttle 26 to exert a downward or valve opening force on spool 83, that force is also reduced. The size of the opening of the flow limiting valve 98, 99 is determined by the balance of the pressure forces acting upwardly on spool 83, and the combined pressure force and spring force acting downwardly on the spool. When the flow to the motor increases to a level such that the pressure in line 96 is sufficiently low that the upward valve closing pressure force exceeds the combined preload on spring 85 and pressure force in primary chamber 119 that tend to hold the flow limiter open, the spool 83 moves upward and starts to close, and tends to limit the flow to the motor.

One characteristic of a flow limiting valve which must work over a large pressure range, is that the flow forces tending to make the valve close become very large as the valve closes. If these forces become too great, the valve can go unstable and either suddenly shut or oscillate. If the load, i.e., the mass of the rotating groups, has appreciable inertia, as it may have with the pump and motor shown here, instability of a flow limiting valve can be oscillatory and can result in cycling of flow, that is, cyclical flow variations with successive peaks and minimas. The mechanism is one wherein high flow causes the valve to move toward closing; the inertia of the rotating groups keeps the flow nearly constant during this part of the cycle, rather than letting it diminish as it would in the absence of the inertia. Thus the closing flow force increases very rapidly, and if the rate of increase is great enough, can cause the valve to slam shut. The rotating groups ultimately slow down so that the flow in the motor inlet 16 reduces, the valve closing force decreases, and the flow limiter valve reopens whereupon the flow cycle starts again.

To avoid this type of instability, I have provided the angulated bores 100 which are in parallel with the main throttling ports 98. These orifices 100 provide an opening flow force that bucks the closing flow force, and I have found that their provision assists greatly in stabilizing the operation of the valve. As shown by the arrows in FIG. 3, flow through diagonal bores 100 to groove 99 is generally upward, and it exerts a reaction force on the spool which is opposite to the upward reaction force of the angularly downward flow of fluid from ports 98 to groove 99. These flow forces tend to cancel; without the bores 100 the full valve closing reaction force from flow through ports 98 would exert a larger closing force on spool 83, with poorer valve stability.

With respect to the other flow limiter-check valve 27a, it acts as a check valve with a variable bypass to tank. It directs to bore 82a that quantity of fluid which is demanded by the B system and it bypasses to tank the remainder of the pump output volume from line 19.

Mode shuttle 26a directs operation of the flow limiter-check valve 27a as a variable bypass check valve. The mode shuttle vents the secondary chamber 114a at the upper end of the bypass piston 84a, through line 115a, groove 72a, and chamber 58a.

The flow limiter-check valve 27a is shown in FIG. 1 in the position it occupies when the entire pump output flow is being directed to tank and none to bore portion 82a—that is, when the work load demands no flow. In these circumstances, pressure beneath spool 83a is high. The secondary chamber formed by bores 114a and 102a is vented to tank via mode shuttle 56a, so that a net upward pressure force is exerted on spool 83a and piston 84a. This net pressure force moves spool 83a upwardly, compressing spring 85a and moving piston 84a upwardly to the position shown. Spool 83a abuts insert 103a at a position at which the valve 98a, 99a is closed, and pressure fluid does not flow to bore 86a from the pump. Piston 84a is held in the position shown such that fluid from line 19 is released to tank via line 117a, groove 118a, diagonal bore 116a, groove 106a, slots 107a, bore 114a, line 115a, chambers 58a, and port 71a. The pressure of fluid in line 19 is applied into chamber 119a, but because chamber 114a is vented, this pressure acts downwardly on spool 83a over a smaller net area than the area on which pressure beneath the piston acts. Valve 98a, 99a remains closed until the pressure in line 19 exceeds the pressure in bore 82a by some value determined by the area of spool 84a, the area of spool 83a, and the force of spring 85a; this indicates a demand for flow to the B system. The downwardly acting force on spool 83a then begins to exceed the upwardly acting force. With downward movement of spool 83a from the position shown in FIG. 1, diagonal bores 100a first come into communication with groove 99a, and flow to bore 83a commences. At the same time, piston 84a is pulled downwardly by rod 110a, and this progressively reduces the area for flow through slots 107a. Thus the bypass flow is reduced as the flow to work is increased.

From this description, it can be seen that spool 83a acts as a check valve, opening to permit flow from line 19 to bore 82a only when the pressure in line 19 is greater by some value than that in bore 82a. Thus the same structure which acts as a flow limiter for the motor, is ported differently to act as a check valve for the pump.

While the variable bypass structure shown is preferred, it is not a necessary part of this fluid transfer package. It may be omitted, and pistons 84, 84a for example can be replaced by solid pistons and the associated porting for carrying the variable bypass flow can be eliminated.

In the foregoing description the transfer package has been described as including a variable unit and a fixed unit. The unit 10 however need not in principle be a variable unit, and the reversibility of control features provided by this invention may be utilized with to fixed units.

Having described my invention, I claim:

1. In fluid power transfer apparatus including interconnected first and second fluid pressure translating devices,
   the improvement comprising,
   valve means including a flow limiter and a check valve for each device, said flow limiter increasingly restricting the rate of flow through it as the flow increases,
   and sensing and control means responsive to the demand for transfer of power from the first device to the second to interconnect the flow limiter in series with the first device and to interconnect the check valve to the outlet of the second device,
   said sensing and control means also being responsive to the demand for transfer of power from the second device to the first to interconnect the flow limiter in series with the second device and to interconnect the check valve to the outlet of the first device.

2. The improvement of claim 1 wherein the sensing and control means includes a pressure operated shuttle exposed at opposed surfaces thereon to pressures in fluid systems served by the first and second devices respectively.

3. The improvement of claim 2 wherein said sensing and control means also includes secondary opposed areas on said shuttle,
   and means applying the higher of the pressures in the said systems to one secondary area and venting pressure on an opposed secondary area, and providing a deadband range of system pressures in which said shuttle does not shift in response to fluctuations in system pressure.

4. The improvement of claim 1 which includes mode reversing means which reverse the connections of the flow limiter and check valves to the respective devices when the direction of transfer of power is reversed.

5. The improvement of claim 4 wherein the mode reversing means is responsive to and is actuated by the sensing and control means.

6. The improvement of claim 1 wherein the flow limiter and check valve associated with each respective device are combined in a single component comprising a spool cooperating with a port in a bore to form a valve, said valve connected at all times in series with the pressure side of the respective device.

7. The improvement of claim 6 which includes
means applying the pressure in the system served by the respective device to an end surface of said spool to act thereon in a direction tending to close said valve,
a spring biasing said valve open,
an opposed surface of said spool subjected to a biasing pressure in a primary control chamber which is a pressure reflecting the rate of flow of fluid through said valve when the associated device is acting as a motor and which is the pump outlet pressure when the associated device is acting as a pump,
and another surface associated with said spool and opposed to said end surface, subjected to a pressure in a secondary control chamber which pressure is equal to the pressure in the primary control chamber when the associated device is acting as a motor and which is vented when the associated device is acting as a pump.

8. The improvement of claim 1 wherein the flow limiter and check valve for each device are a single double function valve comprising a bore having a port communicating with the pressure side of the respective fluid pressure translating device,
a movable valve element forming a variable orifice with said port,
an end area of said element exposed in use to pressure in the system served by the respective device, said pressure urging the element in a direction tending to close said variable orifice,
spring means biasing said variable orifice open,
a flow restrictor establishing a pressure drop in response to flow between the pressure translating device and the respective system,
a first control chamber including a surface of said valve element opposite to said end area, pressure in said chamber tending to open said variable orifice,
a second control chamber including another surface associated with said valve element opposite to said end area,
and means for establishing different pressures in said first and second control chambers to operate said double function valve as a check valve and as a flow limiter.

9. The improvement of claim 8 including,
means responsive to the operation of the respective fluid pressure translating device as a motor to apply the pressure on the lower pressure side of said flow restrictor to said first and second control chambers and operate said double function valve as a flow limiter, and responsive to the operation of the respective fluid pressure translating device as a pump to apply the pressure developed by said pump to said first control chamber and to vent said second control chamber to operate the double function valve as a check valve.

10. The improvement of claim 9 wherein said flow restrictor is provided in said movable element in the flow path between said end area and said port.

11. The improvement of claim 10 wherein said movable element is a spool having an internal cavity therein with an opening in a sidewall thereof which forms said variable orifice with said port, and communicating at an end area thereof with said flow restrictor.

* * * * *